UNITED STATES PATENT OFFICE.

CLAUDE T. J. VAUTIN, OF LONDON, ENGLAND, ASSIGNOR OF ONE-HALF TO CARL JUERGEN CHRISTIAN WICHMANN, OF HAMBURG, GERMANY.

PROCESS OF MAKING CYANIDS OF ALKALINE METALS.

SPECIFICATION forming part of Letters Patent No. 526,592, dated September 25, 1894.

Application filed June 23, 1894. Serial No. 515,512. (No specimens.)

*To all whom it may concern:*

Be it known that I, CLAUDE THEODORE JAMES VAUTIN, a citizen of England, residing at 42 Old Broad Street, in the city of London, England, have invented a new and useful Improvement in the Manufacture of Cyanids of Alkaline Metals, of which the following is a specification.

Cyanids of the alkaline metals such as potassium and sodium have in many cases been manufactured from ferro cyanids by chemical processes whereby, for the iron in the ferro salt, an alkaline metal was substituted. The alkaline metal potassium or sodium used in this process is very expensive and consequently the cyanid thus produced is expensive.

This invention relates to means of greatly cheapening the product, which I effect by employing, instead of potassium or sodium, an alloy of it with lead, which alloy can be produced at a comparatively cheap rate by known processes, such as subjecting the fused chlorid or other salt of the alkaline metal to electrolytic action over a bath of molten lead operating as a cathode.

For producing cyanid, I crush dehydrated ferro cyanid of potassium or sodium, or a mixture of these, and mix it with an alloy of sodium or potassium with lead, which, being brittle, can be easily crushed. By adding a small quantity of mineral oil to the alloy during the crushing operation, little or no loss is occasioned by oxidation of the alkaline metal. If pure cyanid of potassium is required then the ferro cyanid of potassium is mixed with the alloy of potassium and lead; and in like manner for obtaining pure cyanid of sodium, ferro cyanid of sodium is mixed with alloy of sodium and lead. If a mixed cyanid of sodium and potassium is required potassium ferro cyanid is employed with alloy of sodium and lead or sodium ferro cyanid with alloy of potassium and lead. The mixture of the crushed materials is heated in a vessel or furnace from which air is excluded to, but preferably not above, the temperature required for the reaction, about a dark red heat, the result being a fused mass of the cyanid with melted lead and spongy iron. The lead and iron settle out, leaving the fused cyanid which can be poured off or otherwise separated. The lead and iron can be separated from each other, if desired, as for instance by subjecting the mixture to a heat sufficiently high to melt the lead, on an inclined bed, when the molten lead will flow out leaving the iron; or, otherwise, the iron which is in a spongy condition may be finely divided and rabbled over a bath of molten lead which will take up such lead as had been mixed with the iron, leaving the iron free to be raked off. This iron may be used for production of ferro cyanids.

The proportions of the ferro cyanid to the lead alloy naturally depend upon the quantity of the alkaline metal in the alloy. Practically I find a good alloy for the purpose is one containing ten per cent. of the alkaline metal. Assuming this to be the alloy employed, I use in the mixture with ferro cyanid a little more than is sufficient to substitute the chemical equivalent of the alkaline metal for that of the iron in the ferro cyanid. For instance, assuming ferro cyanid of potassium is to be mixed with sodium and lead alloy in order to obtain a compound cyanid of potassium and sodium I should use about ten parts by weight of dehydrated ferro cyanid to thirteen parts of the alloy.

Having thus described the nature of this invention and the best means I know of carrying the same into practical effect, I claim—

The manufacture of cyanids of alkaline metals by heating a mixture of ferro cyanid of an alkaline metal with an alloy of an alkaline metal with lead, and separating the resulting fused cyanid from the residue consisting of iron and lead, substantially as described.

In testimony whereof I have signed my name to this specification, in the presence of two subscribing witnesses, this 11th day of June, A. D. 1894.

CLAUDE T. J. VAUTIN.

Witnesses:
JNO. P. M. MILLARD,
*Clerk to Messrs. Abel & Imray, Consulting Engineers and Patent Agents, 28 Southampton Buildings, London, W. C.*
OLIVER IMRAY,
*Chartered Patent Agent, 28 Southampton Buildings, London, W. C.*